United States Patent
Bowman et al.

(10) Patent No.: US 6,791,283 B2
(45) Date of Patent: Sep. 14, 2004

(54) DUAL MODE REGULATED LIGHT-EMITTING DIODE MODULE FOR FLASHLIGHTS

(75) Inventors: Scott A. Bowman, Fairfax, CA (US); Stephen F. Post, Walnut Creek, CA (US)

(73) Assignee: Opalec, Walnut Creek, CA (US)

( * ) Notice: Subject to any disclaimer, the term of this patent is extended or adjusted under 35 U.S.C. 154(b) by 0 days.

(21) Appl. No.: 10/309,408

(22) Filed: Sep. 6, 2002

(65) Prior Publication Data

US 2003/0076051 A1 Apr. 24, 2003

Related U.S. Application Data

(60) Provisional application No. 60/317,901, filed on Sep. 7, 2001.

(51) Int. Cl.[7] .............................. G05F 1/00; H02H 3/18; G03B 15/02
(52) U.S. Cl. ...................... 315/291; 315/307; 315/312; 361/84; 361/86; 361/87; 362/10
(58) Field of Search ................................. 315/291, 307, 315/297, 200 A, 312, 324, 56, 58, 224; 361/84, 86, 87; 362/10, 800

(56) References Cited

U.S. PATENT DOCUMENTS

| | | | |
|---|---|---|---|
| 4,577,263 A | | 3/1986 | Maglica ...................... 362/187 |
| 5,303,124 A | * | 4/1994 | Wrobel ........................ 362/20 |
| 5,998,925 A | | 12/1999 | Shimizu et al. ............. 313/503 |
| 6,366,028 B1 | | 4/2002 | Wener et al. ............ 315/241 P |
| 6,371,636 B1 | * | 4/2002 | Wesson ....................... 362/545 |
| 6,461,017 B2 | * | 10/2002 | Selkee ......................... 362/249 |
| 6,602,275 B1 | * | 8/2003 | Sullivan ....................... 607/88 |
| 2002/0118497 A1 | * | 8/2002 | Petruska ....................... 361/23 |

OTHER PUBLICATIONS

Naoki Yoshida, "Green light evolution," InGaN LED technology, Nichia America Corporation (Footnote 1).
Nichia Corporation product data sheet, "Lamp Type LED," see chart, "Relative Luminosity vs. Forward Current" and chart "Forward Current vs. Forward Voltage" (Footnote 2 & Footnote 3).
www.Longlight.com, The Flashlight of the Future—Today, Lightwave 2000 Flashlight, Modem Flashlights for the New Millenium, Lightwave, Alpharetta, Georgia, US (Footnote 4).
Lightwave 2000 "Light Output Over Time Test" (Footnote 5).
Inventor's laboratory measurement of battery voltage, battery current, and light intensity for an array of 3 white LEDs connected directly to 3 series connected type N batteries (Footnote 6).
www.lightechnology.com/index.htm, "The Flashlight Without a Bulb," Light Technology, Inc., Sarasota, Florida, US (Footnote 7).

(List continued on next page.)

Primary Examiner—Tuyet T. Vo
(74) Attorney, Agent, or Firm—Donald R. Boys; Central Coast Patent Agency, Inc.

(57) ABSTRACT

An LED illumination module for a flashlight has a housing, electronic control circuitry, and one or more LEDs connected in series and to the circuitry. The module is characterized in that the module is shaped to modularly replace an incandescent-bulb in an existing flashlight. In one aspect the control circuitry operates in a dual mode to extend life of the unit, and to warn when battery replacement is warranted.

12 Claims, 4 Drawing Sheets

OTHER PUBLICATIONS

Eddy Wells, "Economical circuit drives white LEDs," EDN, Nov. 23, 2000 (Footnote 10A).

Leonard Sherman and Wayne Yamaguchi, "One Cell Powers High-Intensity LEDs," Electronic Design Magazine, May 1995, p. 102 (Footnote 10B).

www.cmgequipment.com/infinity2.html, CMG Equipment, Infinity task light (Footnote 11).

Micropower Boost Converter Preliminary Information, Dec. 2000, pp. 1–13, Micrel, Inc., San Jose, California, US (Footnote 12).

Micropower Step-Up DC/DC Converters in SOT-23, 1998, pp. 1–8, Linear Technology, Milpitas, California, US (Footnote 13).

Dave Kim, "Tiny Regulators Drive White LED Backlights—Design Note 231," Linear Technology, Milpitas, California, US (Footnote 14).

Bob Pease, "What's All This Current Limiter Stuff, Anyhow?," Electronic Design Magazine, Sep. 5, 2000, p. 187 (Footnote 8).

Sam Mollet, "Analyze LED characteristics with PSpice," EDN, Jan. 18, 2001, pp. 150 and 152 (Footnote 9).

Intensity vs. Vf data chart for 200 LEDs (Footnote 15).

ZR431L data sheet, Adjustable Precision Zener Shunt Regulator, Issue 1, Nov. 1998 (Footnote 16).

* cited by examiner

DUAL MODE REGULATED LIGHT-EMITTING DIODE MODULE FOR FLASHLIGHTS

CROSS-REFERENCE TO RELATED DOCUMENTS

The present invention claims priority to a U.S. provisional patent application No. 60/317,901, entitled Power-Conversion and Control Circuit for an LED Flashlight, filed on Sep. 7, 2001, disclosure of which is incorporated herein at least by reference. This case is also related to U.S. Pat. No. 4,577,263 issued Mar. 18, 1986 to inventor Anthony Maglica, the which is also incorporated in its entirety by reference.

FIELD OF THE INVENTION

The present invention is in the area of Light Emitting Diode (LED) technologies and pertains particularly to an LED module and control circuitry and methods for replacing incandescent elements in conventional hand-held lights including flashlights.

BACKGROUND OF THE INVENTION

As the technology of LEDs has progressed, leading to increased brightness, the practicality of using LEDs for general illumination and in particular for flashlights has improved. The development of white LEDs has lead to a profusion of commercially available flashlight products. White LEDs are also used as back lights for graphic display devices, and various types of battery operated illumination products. A problem in the design of these products stems from the relatively high operating voltage of the white LEDs, which require approximately 3.5–4.0 Volts, as compared to approximately 1.8–2.5 Volts for LEDs of other colors. Many traditional incandescent lamp flashlight designs use two battery cells each having a voltage of 1.5 Volts; the 3.0 Volts thus developed is incapable of lighting the white LED. LEDs generally yield a light output which is substantially proportional to the current through the LED; the LED current ("forward current") is a nonlinear exponential function of the LED voltage, ("forward voltage"), similar to that of other semiconductor diodes.

One general approach to this problem has been to use more than two cells as the power source. Many commercial LED flashlights use three 1.5 Volt cells connected to the white LED(S) directly or via a small resistor. In devices of this type, the LED current depends strongly on the battery voltage and varies widely as the battery discharges. The LED current also varies to significant degree from unit-to-unit due to normal production variation in the LED forward voltage. These variations are undesirable because they typically cause the LED current to start off very high with a fresh set of batteries, operating the LED(s) at a current in excess of their rating, degrading their brightness and shortening their useful life; later, when the batteries are partially discharged, the current decreases, leading to a long regime of operation in which the light output is relatively weak.

Some products overcome this effect by using a linear current regulator circuit to regulate the LED current as the battery voltage. In operation, the difference in voltage between that of the battery and that of the LED(s) is dropped across the linear regulator circuit; this causes a decrease in efficiency as compared to the direct connection described above.

Another drawback to these methods is that if multiple LEDs are used, they are typically connected in parallel. If multiple LEDs are connected in series, the voltage required is then multiplied by the number of series connected LEDs. Although a high voltage battery comprised of many cells (for example, 8 cells to give 12 Volts) could be used, the size, weight and cost of the battery are increased due to the extra material needed to make up the many individual cells. If multiple LEDs are connected in parallel, the current in each of the LEDs will depend on the relative forward voltages of the particular LEDs used. If the LED forward voltages are much different, one of the LEDs may take more than its share of current leading to the brightness degradation and lifetime shortening noted above. The LED currents will generally only be equal if the devices are well matched in forward voltage. The sorting and matching needed to assure good current sharing adds cost and complexity to the manufacture of products which use parallel LEDs. The addition of resistors in series with the individual paralleled LEDs can improve the current sharing, with some decrease in efficiency.

Another general method of overcoming the difficulties brought on by the high voltage needed to operate white LEDs is to use an electronic power conversion circuit to derive a voltage higher than that of the battery. There are many circuit topologies that can perform this conversion, and they are well known in electronic power supply technology. A few have been successfully applied to the design of LED lighting products.

The particular topology described here is the boost converter, which uses an inductor as an energy storage device. The circuitry of the boost converter may be made from discrete electronic components, or by the use of one of a number of specialized integrated circuits which are sold for this purpose. The use of the boost converter overcomes many of the problems outlined above. The output voltage of the converter can be controlled in various ways so that the LED current need not depend strongly on the battery voltage, and can be regulated and precisely tailored to achieve specific goals, as will be described. Since the battery voltage can be increased by an arbitrary factor, any number of LEDs can be connected in series, obviating the need to parallel LEDs. The power loss due to imperfect conversion efficiency of the boost converter makes this approach less efficient than direct battery connection of the LED(s), but compares favorably with linear current regulator methods. Circuit complexity is the only other drawback to the boost converter approach.

Note that many electronic boost converter circuits, especially those that use integrated circuits, are susceptible to damage from reverse polarity connection of the battery. Since reversal of the batteries is a common mistake, it is desirable to include some form of reverse battery protection. Ideally, this should have minimal effect on power conversion efficiency and be simple and low cost.

Low battery indicators are of course not new in electronics or in flashlights. However, LED flashlights benefit more from an indicator than flashlights based on incandescent lamps. The reason for this is that whereas incandescent lamps generally show the user that the batteries are becoming weak by a noticeable change in the color of the light, LEDs display little or no change in the color or character of the light produced, even over a wide range of light intensity. Since the human eye perceives light intensity over a very wide range ($10^8:1$), small changes (2:1) are difficult to discern, and even larger changes (10:1) may not be obvious. Thus, it is difficult to tell if the light output of an LED flashlight has decreased, as compared to the light given with fresh batteries. A battery indicator lets the user know that the batteries are getting weak, even though the light output is still useable.

In the above description of prior art the inventor has drawn upon a number of documents available in the art. These documents are provided in an Information Disclosure Statement filed with the present patent application.

In addition to the above background, there are at the time of the filing of the present patent application a relatively large number of flashlight products implementing incandescent bulbs as a light source commercially available, and a relatively smaller number of such flashlights that use LEDs as a light source. An example of the former of particular interest to the present inventor are models of miniature flashlights using incandescent bulbs, and marketed under the registered tradename of Mag Light™ products. It is an object of the present invention to provide easily-usable LED modules for retrofitting existing incandescent flashlight products, in particular those made by Mag Instrument, Inc., and sold under the tradename of Mag Light™. Such a retrofit module should be designed to maintain the original twist on-off switch function of the flashlight, and preserve or improve the original mechanical ruggedness. The retrofit changes should be easy to make, even by those unskilled and unfamiliar with the construction of the flashlight. There should be no damage or permanent changes to the flashlight, and the retrofit modification should be reversible at a later time if desired What is needed is a circuitry design that controls the LEDs to maintain a steady and constant level of illumination over an extended period of time, followed by a low battery state, during which the light output is allowed to decrease while keeping the batteries at a constant voltage, and during which time an indication mechanism warning of low battery strength is provided. A further need in the art is for a replacement module incorporating white-light LEDs that can easily, inexpensively, and modularly replace incandescent bulbs in existing lighting products, such as those made by Mag Instrument, Inc., and referenced above.

SUMMARY OF THE INVENTION

In a preferred embodiment of the present invention an LED illumination module for a flashlight is provided, comprising a housing, electronic control circuitry, and one or more LEDs connected in series and to the circuitry. The module is characterized in that the it is shaped to modularly replace an incandescent-bulb in an existing flashlight.

In preferred embodiments the circuitry provides two distinct operating modes, a first mode stabilizing current through the LEDs as battery voltage wanes, and a second mode activated at a selected voltage to stabilize battery voltage and to trigger a low-battery alert. The alert mechanism can be any one of a colored LED, an audio element, or intensity modulation of one or more of the LEDs. In some embodiments the control circuitry also comprises reverse polarity protection circuitry to avoid damage to components due to reversed battery polarity. This protection circuitry may comprise a MOSFET configured to block the flow of current of reverse polarity, and to conduct current of correct polarity, said MOSFET being turned on by a voltage higher than that of the battery and provided by a DC/DC voltage boost converter.

In another aspect of the invention, in a LED illumination module having one or more LEDs, a control system for regulating power conversion and illumination intensity of the LED module is provided, comprising a voltage boost DC/DC converter, operating from a battery and powering said LEDs, a first feedback mechanism for regulating LED current by controlling said voltage boost DC/DC converter, a second feedback mechanism for regulating battery voltage by controlling said voltage boost DC/DC converter, and a mechanism for automatically transitioning between the first and the second feedback mechanisms in response to a predetermined battery voltage threshold.

In a preferred embodiment the module can be retrofitted to an existing hand-held light. Also in a preferred embodiment there may be reverse polarity protection circuitry to avoid damage to components due to reversed battery polarity. In some cases the reverse polarity protection circuitry comprises a MOSFET configured to block the flow of current of reverse polarity, and to conduct current of correct polarity, said MOSFET being turned on by a voltage higher than that of the battery and provided by a DC/DC voltage boost converter.

In some embodiments of the control system a low battery indicator is provided, enabled to alert the user when transition between the first and the second feedback control modes occurs, or is about to occur. In some cases alerting the user is accomplished via an LED indicator. In other cases alerting the user may be accomplished via an audio sound producing device, or through intensity modulation of one or more of the LEDs.

In yet another aspect of the invention a method for controlling a LED module having one or more LEDs s provided, comprising steps of (a) providing power to the one or more LEDs through a DC/DC converter from a battery pack providing an input voltage; (b) feeding back a signal representative of LED current to the converter to maintain a substantially constant LED current as the batteries discharge and the input voltage decreases; (c) beginning at a preset value for input voltage, switching to a mode of battery voltage control feedback to the converter to reduce current to the LEDs in a manner to maintain the battery voltage at a substantially constant value.

In a preferred embodiment of the method there is a step (d) for initiating a low-battery alert mechanism at or near the pre-set input voltage. The alert mechanism may be one or another of lighting a color LED, an audio signal, or intensity modulation of the one or more LEDs.

In yet another aspect of the invention a method for retrofitting a flashlight having a body cylinder and an incandescent bulb mounted with a reflector in an insulator receptacle translatable by rotating a head assembly relative to the body cylinder, said translation opening or closing a contact to the body cylinder as an on-off mechanism, the method comprising steps of (a) removing the head assembly; (b) replacing the reflector with an adapter ring; (c) removing the incandescent bulb; (d) removing the translatable insulator receptacle, and replacing it with a LED module of substantially the same geometry, but comprising one or more white-light LEDs; and (e) replacing the head assembly.

In a preferred embodiment, in step (d), the LED module further comprises electronic control circuitry for converting and managing the transfer of battery power to the one or more LEDs. In some cases the control circuitry operates in a dual mode, a first mode controlling LED current to be substantially constant while battery voltage deteriorates, and a second mode allowing LED current to decrease while maintaining battery voltage substantially constant, the second mode triggered at a preset voltage value.

In embodiments of the present invention described in enabling detail below, for the first time a replacement module is provided that allows convenient retrofitting of flashlights to operation with white LEDs.

BRIEF DESCRIPTION OF THE DRAWING FIGURES

DESCRIPTION OF THE PREFERRED EMBODIMENTS

One object of this invention is electronic circuitry described in enabling detail below.

Figure 1:
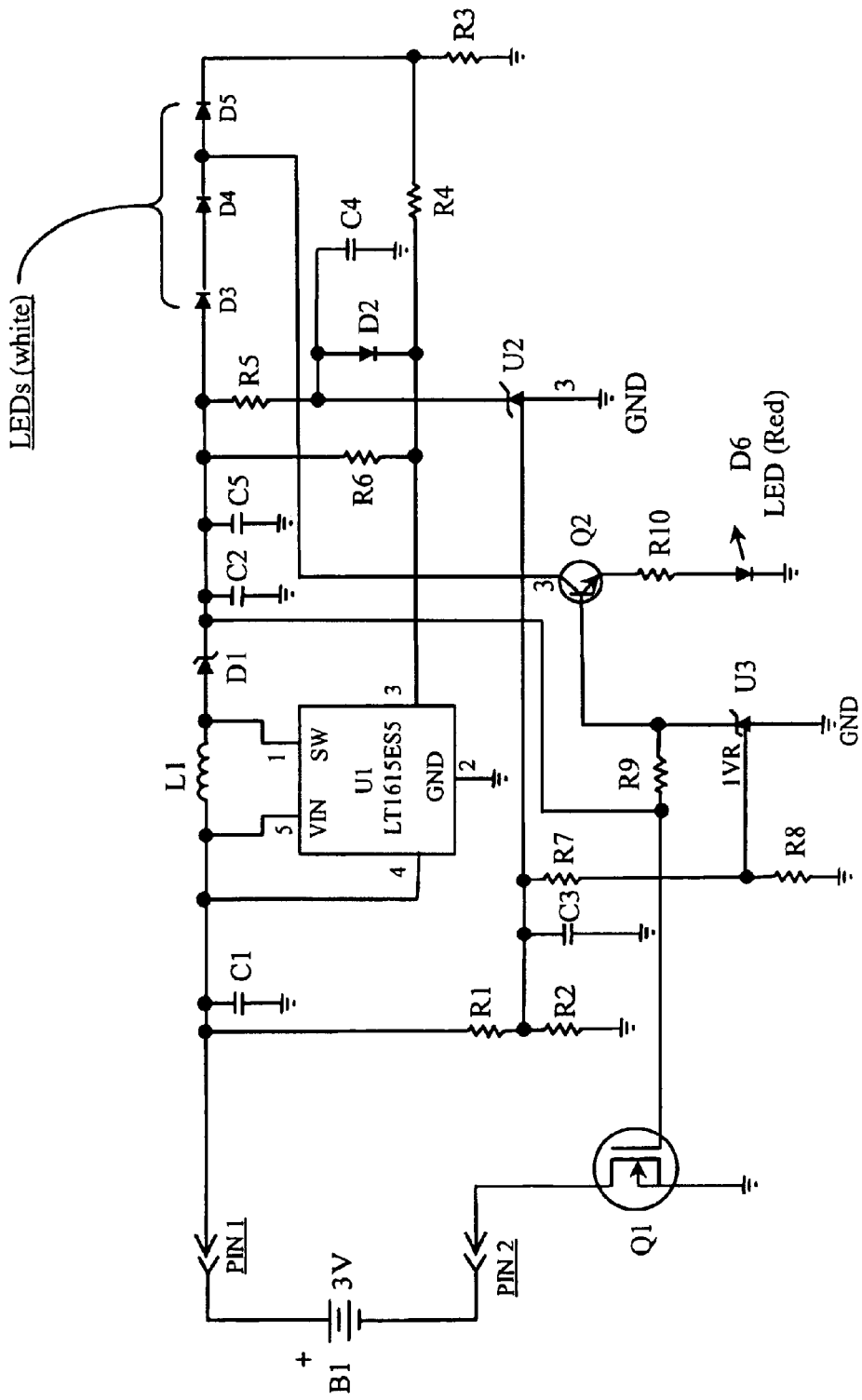
FIG. 1 is an exemplary circuitry diagram for LED power and control according to an embodiment of the present invention.

The following describes the circuit in an embodiment of the invention as shown in schematic form in FIG. 1. The components of this circuit are further described in the Bill of Materials, FIG. 2 of the priority provisional patent application referenced above, which is a part of the present patent application. Circuit power in this example is provided by a 3 Volt battery B1 via connector pins 1, 2. Three illumination LEDs D3, D4, D5, are connected in series. The circuit uses an integrated circuit boost converter U1 (in this example type LT 1615 from Linear Technology Corp., Milpitas, Calif.) as a main part. The operation of this IC is well described in the manufacturer's literature, along with typical application circuits, including driving LEDs. The boost inductor L1, Schottky diode D1, input capacitor C1, output capacitors C2, C5 are used as described. The LEDs are connected in series with a current sense resistor R3. In this typical example, the converter output voltage at cathode of D1 is approximately 12 Volts; the LED current is approximately 30 mA.

Components R3, R4, R6, comprise circuitry used to provide LED current regulation. The LED current sense voltage developed across R3 is fed to the feedback input pin 3 of U1 via resistor R4. Resistors R6 and R4 form a voltage divider which adds to the voltage at R3 a voltage proportional to the converter output voltage. U1 acts to regulate the voltage at pin 3 to a nominal 1.23 Volts; the sense voltage at R3 is lower; typically about 0.45 volt. The action of the voltage divider R6, R4 is important for two purposes. One is to reduce the voltage across sense resistor R3 in order to improve the overall circuit power conversion efficiency. The other purpose is to compensate for part-to-part variations in the forward voltage of the LEDs. By making the feedback signal to U1 vary directly with converter output voltage as well as with LED current, the circuit acts to approximately regulate the converter's output power. If, for example, the 3 LEDs used have unusually high forward voltage drop, the feedback action will result in a LED current lower than usual. Conversely, a unit with unusually low LED forward voltage will provide a higher LED current to compensate. The inventor has found that for a constant LED current, LED brightness intensity is roughly proportional to forward voltage. There is considerable statistical variation, but this relation generally holds. Thus the action of the circuit described tends to improve the unit-to-unit variation in brightness from that expected due to part-to-part LED light output variation. Note that since many boost converter integrated circuits feature 1.25 Volt feedback references, this method is applicable to other, different circuit implementations.

Components R1, R7, R8, C3, U2, R5, C4, D2 comprise circuitry used to perform a constant voltage limiting function. With the component values shown, this circuitry acts to reduce the LED current when the battery voltage falls below 1.80 Volts; when this occurs, an equilibrium condition is achieved in which the battery will supply whatever current it can without falling below this voltage. Integrated circuit U2 is a bandgap shunt regulator. In this application, U2 acts as a high gain feedback amplifier with a reference voltage of 1.24 Volts. Resistors R1, R7, R8 form a voltage divider that provides a voltage proportional to the battery voltage to input pin 1 of U2. When the voltage at this input is above 1.24 Volts, corresponding to a battery voltage above 1.80 Volts, U2 output pin 3 will be pulled low; this will reverse bias diode D2; under these conditions the boost converter will operate at constant LED brightness as described above. When the battery voltage falls below 1.80 volts, the input to U2 will fall below 1.24 Volts; this will cause U2 output to rise, pulled up by R5; this will forward bias diode D2. Current flow through D2 will cause a voltage drop across R4; voltage at R3 will drop as U1 continues to regulate its feedback voltage to 1.23 Volts, thus the LED current will decrease. This feedback action will force a reduction in LED current to whatever extent is required to prevent the battery voltage from decreasing below 1.80 Volts. In this way, the nearly exhausted battery is allowed to supply whatever current it can, and the LED brightness is reduced accordingly. Many hours of reduced performance operation follow the initial regulated full brightness interval. Capacitor C3 filters noise at the voltage divider output; C4 acts to stabilize the feedback action of U2.

Components R1, R7, R8, U3, R9, Q2, R10, D6 comprise circuitry of a low battery voltage indicator. Typically, this circuitry lights red LED indicator D6 when the battery voltage falls below 2.0 volts. Integrated circuit U3 is another bandgap shunt regulator, identical to U2; the inputs to both come from taps on voltage divider R1, R7, R8 (Optional resistor R2 is used to make product models without the indicator circuitry avoiding the need to include both R7 and R8). When the battery voltage is above 2.0 Volts, U3 output will be pulled low, turning off transistor Q2 and preventing substantial current flow through indicator LED D6. When the battery voltage falls below 2.0 volts, Q2 will be turned on by current flow through R9; this will cause current to flow through D6, limited by R10. The brightness of the indicator LED is set by the value of R10; and is typically about 2 mA. Note that the current for the indicator function is supplied to Q2 collector from a tap in the illumination LED series string; the voltage at this point is approximately 4 Volts. By connecting the indicator circuitry to this point, rather than to the boost converter output, the current for the indicator is diverted from D5, but does flow through D3 and D4, resulting in a slight improvement in efficiency during indicator operation. A possible circuit variation is to connect the cathode of the to indicator LED D6 to the LED current sense resistor R3 rather than to ground as shown. The effect of this is to keep the operating current of the illumination LEDs D3 and D4 constant when the indicator comes on. Another possible variation is to operate the indicator LED directly from the 12 Volt output of the boost converter; this is slightly less efficient, but does not lead to any change in the white LED brightness when the indicator operates. Yet another possible variation is to operate the indicator LED directly from the battery voltage while making use of the boost converter; this is more efficient, but the voltage available from the battery during the period when the indicator is on is barely enough to light the indicator LED.

Note that an object of this configuration is to give the user an indication that the battery has discharged almost to the point at which the transition takes place from constant brightness to constant voltage operation. Other means of making this indication are possible, for example, blinking or flickering the illumination LEDs, or an audible sound, and these may have advantages such as more readily discernable indication or lower cost.

MOSFET Q1 serves to protect the circuitry, especially U1, from damage if the battery is connected with reverse polarity. Q1 blocks current flow if the battery is reversed. When the battery is properly connected, current initially flows due to the action of the internal body-drain diode of Q1. When the boost converter begins to operate, the output voltage connected to Q1 gate causes Q1 to turn on and reduces the voltage drop across Q1 from that expected for a diode to a low value determined by the battery current and Rds of Q1.

In the above description of preferred embodiments the inventor has drawn upon a number of documents available in the art. All such documents are provided with an Information Disclosure Statement filed with the present application.

One with skill in the art will recognize that the circuitry of the present invention in varying forms can be applied to a wide variety of battery-powered lighting devices without departing from the spirit and scope of the invention. In one embodiment, the functions of U2, R5, D2, C4, and R7 (that is, the function of regulating constant battery voltage during the low battery operating regime) can be provided as an integrated function of U1 eliminating the need for the same circuitry outside of the IC. Likewise, although the circuit design shown is based on off-the-shelf integrated circuits and components, it would also be possible to execute a design in which all or most of the functions described are performed by a single integrated circuit which is custom designed for this purpose. This would simplify the construction of the LED module, and reduce its manufacturing cost.

Figure 2:
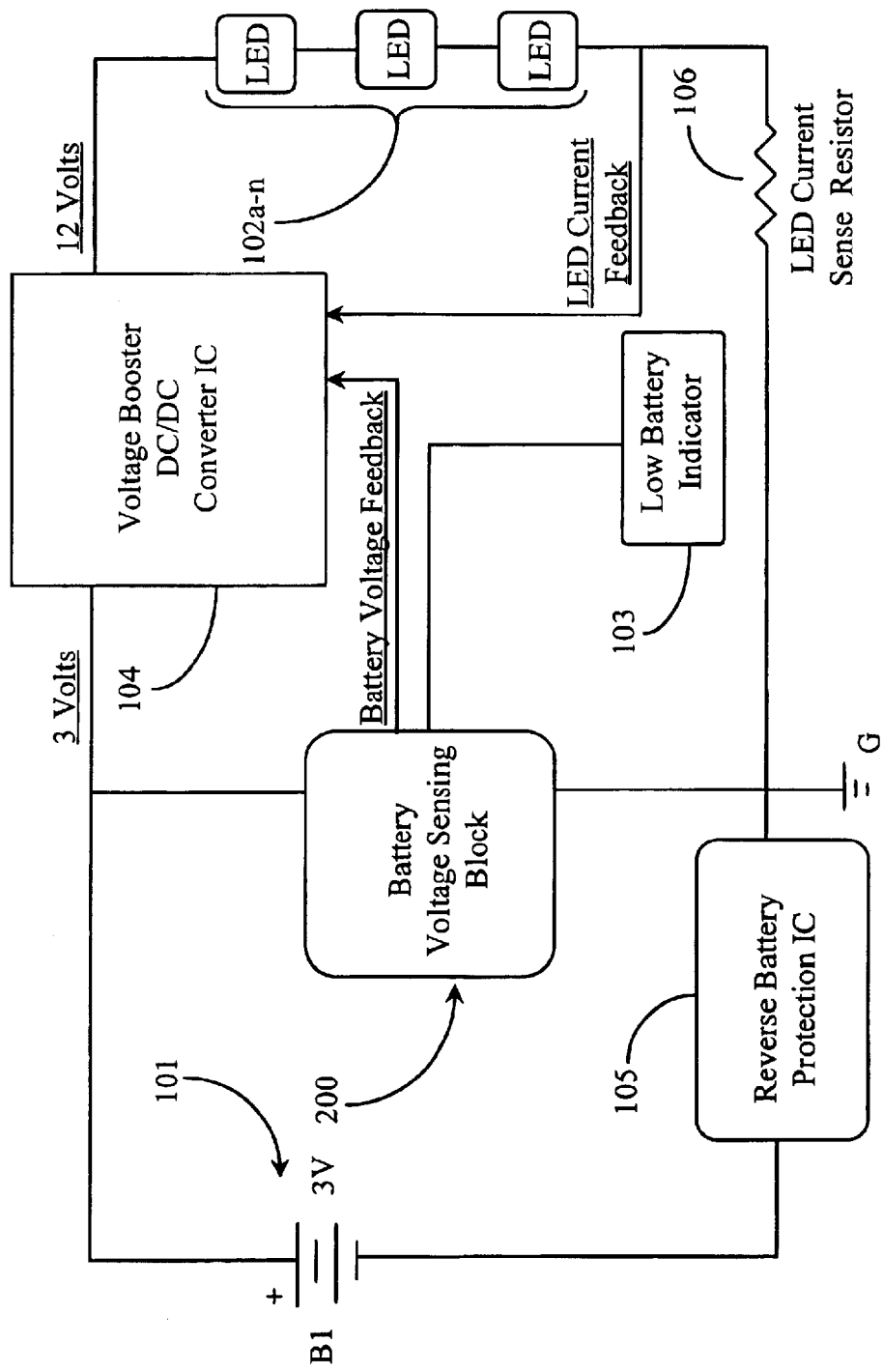
FIG. 2 is a simplified block diagram illustrating main components of the circuitry of FIG. 1.

FIG. 2 is a simplified block diagram illustrating main components of circuitry 100 of FIG. 1. The basic components of circuitry 100 are described also in block form as follows to further clarify novel function of the circuitry.

Power to the circuitry (101) is typically 3 Volts provided by two 1.5 Volt batteries indicated as B1. A reverse battery protection block 105 is provided which serves to prevent damage to the other circuitry which might otherwise occur if the user inserts the batteries backwards. A voltage boost DC/DC converter circuit 104 raises the battery voltage to a level sufficient to operate the series connected string of LEDs, 102a–n. For the example shown using 3 white LEDs, this will be approximately 12 Volts. This invention may be practiced with any number of LEDs, and the voltage will differ accordingly. Although in the example circuitry detailed above, the boost converter 104 is an inductor-based boost-type converter, other DC/DC converter topologies known in the art may be substituted for block 104 without deviating from the teaching of this invention, for example, a switched-capacitor type DC/DC converter, or other topologies using an inductor or transformer.

Operation of the boost converter 104 is governed by two feedback paths, as shown. A first feedback path is from a current sense resistor 106 connected in series with the LEDs. In operation, this feedback path serves to stabilize the LED current so that it remains substantially constant in spite of the voltage change which occurs as the batteries discharge. This constant current operation of the LEDs leads to substantially constant LED light intensity over the useful life of the batteries. A second feedback path is from a battery voltage sensing block 200 and is designed to become operative only at times when the battery voltage is less than a predetermined threshold. This threshold corresponds to the voltage at which the battery's stored energy is largely depleted and for the 3 Volt battery shown would be approximately 1.8 Volts. Under the low battery condition in which this second feedback path is operative, it is able to override the action of the first constant current feedback action and serves to stabilize the battery voltage at the predetermined threshold. In this way, the mostly depleted battery is allowed to supply whatever current it can at that voltage. The LED current and light intensity are no longer stabilized and will fall to values corresponding to the reduced battery power output. Without this second feedback mechanism, the voltage of the depleted battery would quickly fall to a low value insufficient to operate the boost converter circuitry and the light would abruptly extinguish, leaving the user in the dark. With this constant battery voltage function, the user is able to enjoy a long period of gradually diminished light output, even though the batteries are too weak to support the constant light intensity operation described above.

The usefulness of this constant light output/constant battery voltage control scheme is enhanced by a low battery indicator function 103, which is operatively connected to the battery voltage sensing block 200. The battery voltage sensing block is designed to operate the low battery indictor 103 at a battery voltage equal to or slightly above the voltage threshold at which the boost converter 104 makes the transition from constant LED current to constant battery voltage operation. This lets the user know that batteries are mostly depleted and that light is no longer producing full light output; it may be thought of as a "reserve" form of operation. The low battery indicator 103 may be a single LED of a color different from that of the main illumination LEDs, typically, white LEDs with a red low battery indicator LED. Alternately, other forms of low battery indication may be substituted for the block 103, for example an audible sound, a tactile vibration, or a flicker or other intensity modulation of the main illumination LED light output.

Note that the low battery indicator, while highly useful and desirable, is not required to practice the invention, and all of the operational features described above may be practiced without the indicator, but within the scope of the present invention.

Figure 3A:
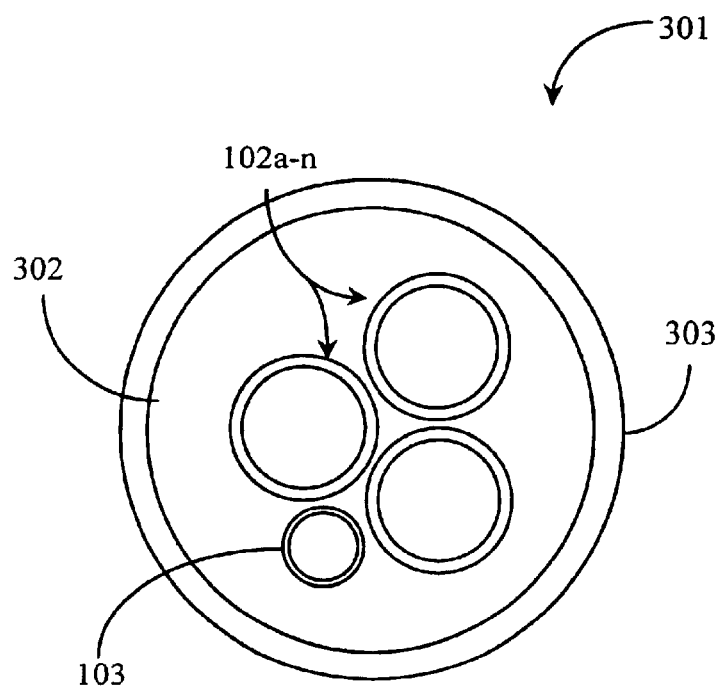
FIG. 3A is an overhead view of an LED module according to an embodiment of the invention.

FIG. 3A is a plan view of an LED and circuitry module 301 according to a preferred embodiment of the invention. Three white LEDs 102a–n are disposed in a triangular array pattern, with a red low-battery indicator LED 103 located in an adjacent position. The LEDs are mounted to a circuit board 302 as described further below, and the LED plus circuitry assembly is inserted into a cup 303, as also described more fully below. In operation, the module 301, comprising the LEDs, the circuitry, and the cup, is installed within the housing of a flashlight as also described below, so that light from the white LEDs shines from the flashlight, and the red low battery indicator is visible to the user by looking at the flashlight beam from a low angle. The number of LEDs and their array geometry are optional and a specific number is not absolutely required in order to practice the invention.

Figure 3B:
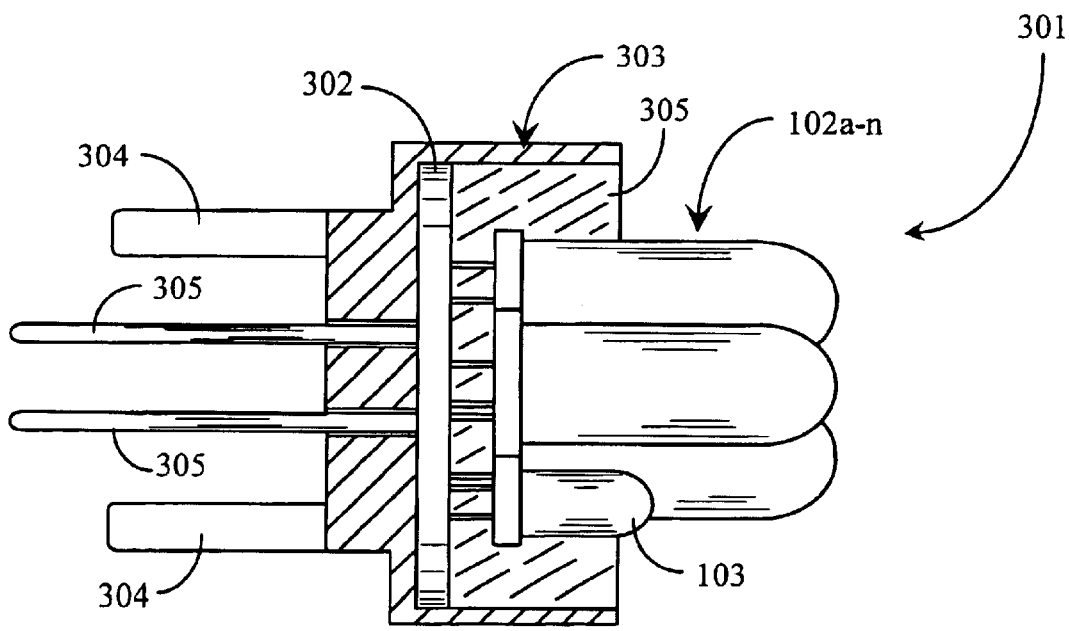
FIG. 3B is an elevation view of the module of FIG. 3A.

FIG. 3B is a side elevation view of module 301 of LED illumination module 400. White LEDs 102a–n and red indicator LED 103 are attached to a round printed circuit board 302 by their electrical leads through conventional soldering techniques. The number of LEDs, their type, relative positions, and method of attachment may vary from this example. Electronic circuitry to perform the power conversion and control functions described elsewhere in this invention is assembled on one or both sides of printed circuit board 302 by conventional electronic assembly techniques. Connector pins 305 are attached to printed circuit board 302 by mechanical staking or other suitable assembly process. The assembly of the LEDs and the printed circuit board is assembled into cup 303, which has extensions 304 for engaging openings in a part of a flashlight to be retrofitted. Leads 305 are passed through suitable openings in the cup as shown. Cup 303 is shown in cross section to more fully illustrate the relationship of the various parts to one another. The assembly of LEDs to the circuit board is fixed in place within cup 303 and environmentally sealed by application of epoxy potting material 305. The result is module 301 which may be conveniently assembled in existing flashlights.

Figure 4:
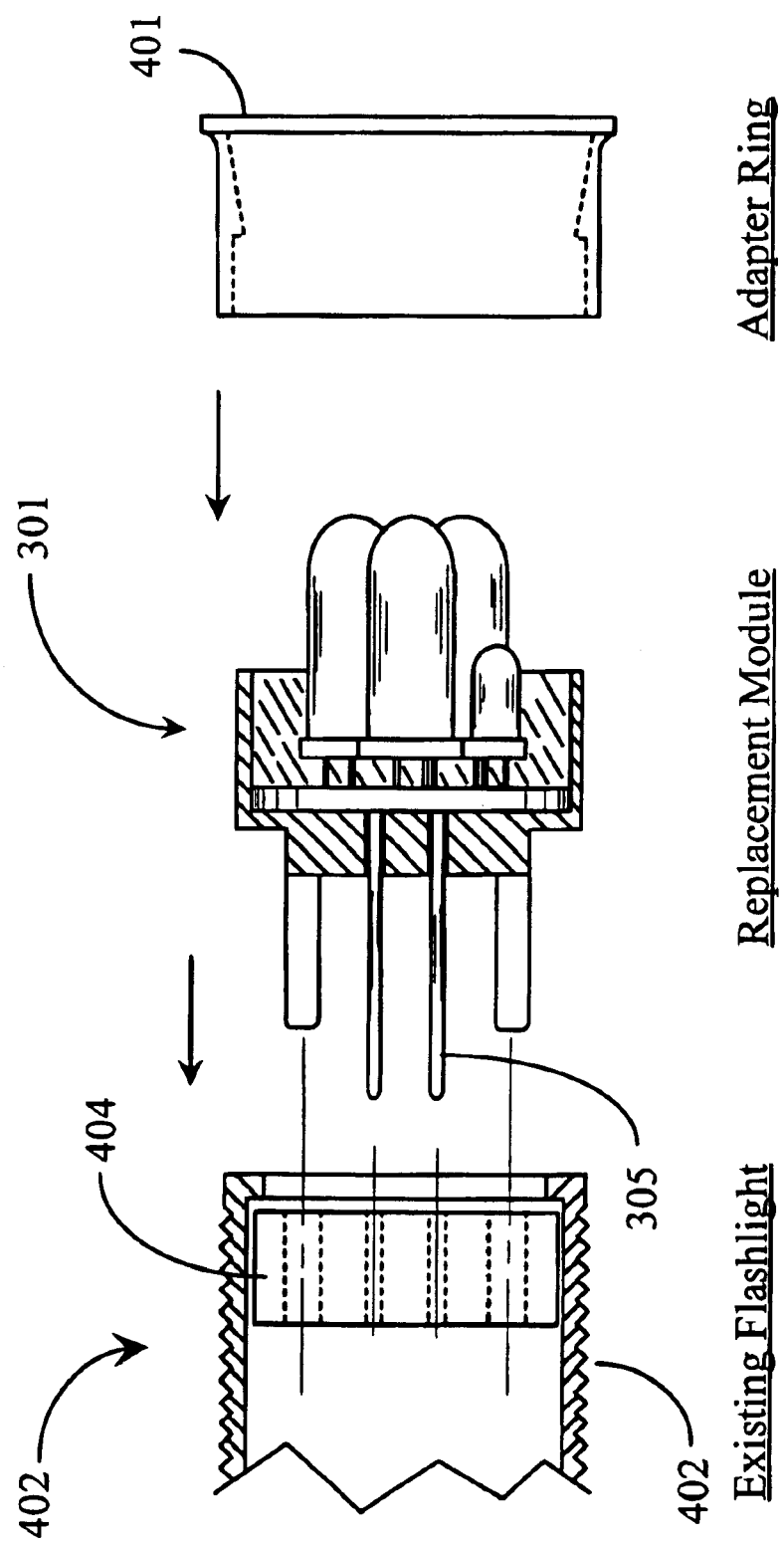
FIG. 4 is an exploded view showing assembly of a replacement module to an existing flashlight according to an embodiment of the present invention.

FIG. 4 is an exploded view illustrating insertion of replacement module 301, and of an adapter ring 401 which accompanies it, into a flashlight in a retrofit procedure according to an embodiment of the present invention.

In FIG. 4, element 402 represents the illumination end of an existing flashlight as may be seen in U.S. Pat. No. 4,577,263 referenced above. The head end of the flashlight has been removed, exposing external threads 403. Element 404 is a part of a switch in the flashlight, referenced in U.S. Pat. No. 4,577,263 as the lower insulator receptacle 41 (FIG. 3 of U.S. Pat. No. 4,577,263). One simple inserts the replacement module into the insulator receptacle and replaces the head end of the flashlight (not shown) using ring 401 in place of the reflector of the flashlight, which is no longer needed.

In operation pins 305 form the electrical contacts to the battery of the flashlight and mimic in size, shape and position the contact pins of the original incandescent bulb of the flashlight which the module replaces.

Adapter ring 401, made of molded plastic, replaces the original reflector of the flashlight during the retrofit process. Since the LEDs provide a focused beam by means of their integral body lenses, no reflector is needed. Adapter ring 401 has an internal step feature of slightly larger internal diameter then the outside diameter of module 301. In use, module 301 fits loosely within adapter ring 401, which itself is firmly fixed within the head of the flashlight in place of the original reflector, as will be further described below.

The components in this example are intended to replace the incandescent bulb and housing hardware normally used in a particular model of flashlight that is very popular in the marketplace. However, there are other types of flashlights not of identical design that may be retrofitted with a potted module the same as or quite similar to module 301 without departing from the spirit and scope of the invention. Small modifications in supporting hardware can be provided for differing diameters and for different switch arrangements, bulb locations and so on. The inventor illustrates this configuration as one possible configuration of a variety of possible configurations. Therefore the present example should not be construed as limiting to only the exact elements described.

Referring again to U.S. Pat. No. 4,577,263 to inventor Anthony Maglica (hereinafter '263), which is referenced above and has been incorporated in the present application by reference, a method for retrofitting an LED lighting module to an incandescent flashlight is described in enabling detail below. Attention is drawn to '263 FIGS. 1 through 7 and the description of these figures in the section entitled "Detailed Description of a Preferred Embodiment", which begins in column 3, line 24 of '263. Referring specifically to FIG. 2 of '263, an on-off switching capability is described wherein batteries 31, urged forward by spring 34, in turn urge forward insulator receptacle 41. Receptacle 41, though, is urged rearward by insulator receptacle 47 in contact with and engaged into receptacle 41 by extensions described in column 4, lines 4 and 5, that engage openings 55 in receptacle 41. These are later referred to as "peg" extensions). Receptacle 47 may be moved rearward by screwing head 24 more fully onto barrel 21.

On-off switching is accomplished by electrode 42 contacting lip 47 of metal barrel 21, completing an electrical circuit path from the opposite terminals of the batteries through incandescent bulb 45. This contact is made by unscrewing head 24 and unmade (broken) by screwing in head 24. It should be noted that the extensions on receptacle 47 that engage the openings 55 are arcuate shaped, and the openings match their shape. It will be obvious to the skilled artisan, however, that these extensions and openings might easily and conveniently have other shapes, such as cylindrical.

Referring now to FIGS. 3a, 3b and 4 of the present patent application, the inventors have provided an LED module and a method for retrofitting such a flashlight as shown and described in '263 to operate with one or more white light LEDs in place of incandescent bulb 45, while maintaining the original switch function and the ruggedness of the original flashlight, while also being easy to install (requires no tools or difficult instructions), causing no damage to the flashlight, and in a way that the assembly may be reversed to restore the incandescent bulb and the original function of the flashlight.

The following describes, step-by-step, a method for accomplishing the retrofit beginning with the flashlight shown in the figures of '263, or a substantially similar flashlight:

1. Unscrew flashlight head (24 of '263) until it comes off. The bulb (45 of 263) will be lit. Do not remove batteries.
2. Remove the bulb by gently pulling it out with your fingers.
3. At the front of the flashlight head, unscrew the metal ring (25 of '263).
4. Remove the shiny reflector (51 of '263) and replace it with the adapter sleeve (401 of FIG. 4 of present application).
5. If the lens (26 of '263) is scratched, replace it with a new lens provided. The o-ring should stay in front of the lens.
6. Screw metal ring 25 of '263 back on. Set the resulting head assembly aside. The reflector should be saved if returning to incandescent operation is considered an option.
7. In the flashlight barrel, remove the plastic piece marked "DO NOT REMOVE", which is insulator receptacle 47 of '263. Also save this piece if returning to incandescent operation is an option. A knife edge or fingernail may be used to pry it out.
8. Install the NewBeam LED module (301 of FIG. 3b of the present application) by inserting its two peg extensions (404 of FIG. 4 of present application) into the openings where the peg extensions of the "DO NOT REMOVE" piece (47 of '263) came out. Be very careful to push the module straight into place; don't try to force it at an angle.
9. If the module did not light, the polarity is reversed. Remove element 301 module, rotate 180 degrees, and reinstall. This will correct the polarity.
10. Screw flashlight head (24 of '263) firmly back into place, so that the light goes off.
11. To fully seat the LED module, tap the front of the flashlight against a firm surface.

It will be apparent to the skilled artisan that if unused parts are saved, including the incandescent bulb, the procedure may be reversed to restore the original function of the flashlight.

One with skill in the art will recognize that the method and apparatus of the present invention can be economically applied to many is types of hand-held low-voltage light applications. Moreover, economical benefit in operation is enabled by the dual-mode capabilities of module 301. The method and apparatus of the present invention should therefore be afforded the broadest possible weight under examination. The method and apparatus of the invention should be limited only by the claims that follow.

What is claimed is:

1. An LED illumination module for a flashlight, comprising:
   a housing;
   electronic control circuitry; and
   one or more LEDs connected in series and to the circuitry;
   wherein the electronic control circuitry provides two distinct operating modes, a first mode substantially stabilizing current through the LEDs as battery voltage wanes, and a second mode active below a preset battery voltage to substantially stabilize battery voltage while allowing current to the LEDs to decrease, also allowing light intensity to decrease as well.

2. The LED module of claim 1 wherein activation of the second mode also triggers a low-battery alert.

3. The LED module of claim 2 wherein the low-battery alert comprises a colored LED.

4. The LED module of claim 2 wherein the low-battery alert comprises an audio element.

5. The LED module of claim 2 wherein the low-battery alert comprises intensity modulation of one or more of the LEDs.

6. An LED illumination module for a flashlight, comprising:
   a housing;
   electronic control circuitry; and
   one or more LEDs connected in series and to the circuitry;
   wherein the electronic control circuitry includes reverse polarity protection circuitry having a MOSFET blocking flow of current of reverse polarity, and conducting current of correct polarity, said MOSFET being turned on by a voltage higher than that of the battery provided by a DC/DC voltage boost converter.

7. An LED illumination device, comprising:
   electronic control circuitry; and
   one or more LEDs connected in series and to the circuitry;
   wherein the electronic control circuitry provides two distinct operating modes, a first mode substantially stabilizing current through the LEDs as battery voltage wanes, and a second mode active below a preset battery voltage to substantially stabilize battery voltage while allowing current to the LEDs to decrease, also allowing light intensity to decrease as well.

8. The LED illumination device of claim 7 wherein activation of the second mode also triggers a low-battery alert.

9. The LED illumination device of claim 8 wherein the low-battery alert comprises a colored LED.

10. The LED illumination device of claim 8 wherein the low-battery alert comprises an audio element.

11. The LED illumination device of claim 8 wherein the low-battery alert comprises intensity modulation of one or more of the LEDs.

12. An LED illumination device, comprising:
    a housing;
    electronic control circuitry; and
    one or more LEDs connected in series and to the circuitry;
    wherein the electronic control circuitry includes reverse polarity protection circuitry having a MOSFET blocking flow of current of reverse polarity, and conducting current of correct polarity, said MOSFET being turned on by a voltage higher than that of the battery provided by a DC/DC voltage boost converter.

* * * * *